May 15, 1945.  C. E. MILLER ET AL  2,376,164
PRECISION THREADING ATTACHMENT
Filed May 24, 1943  3 Sheets-Sheet 1

Inventors
Carroll E. Miller
John R. Ingalls
by Wright Brown Quinby & May
Attys.

May 15, 1945.   C. E. MILLER ET AL   2,376,164
PRECISION THREADING ATTACHMENT
Filed May 24, 1943   3 Sheets-Sheet 2
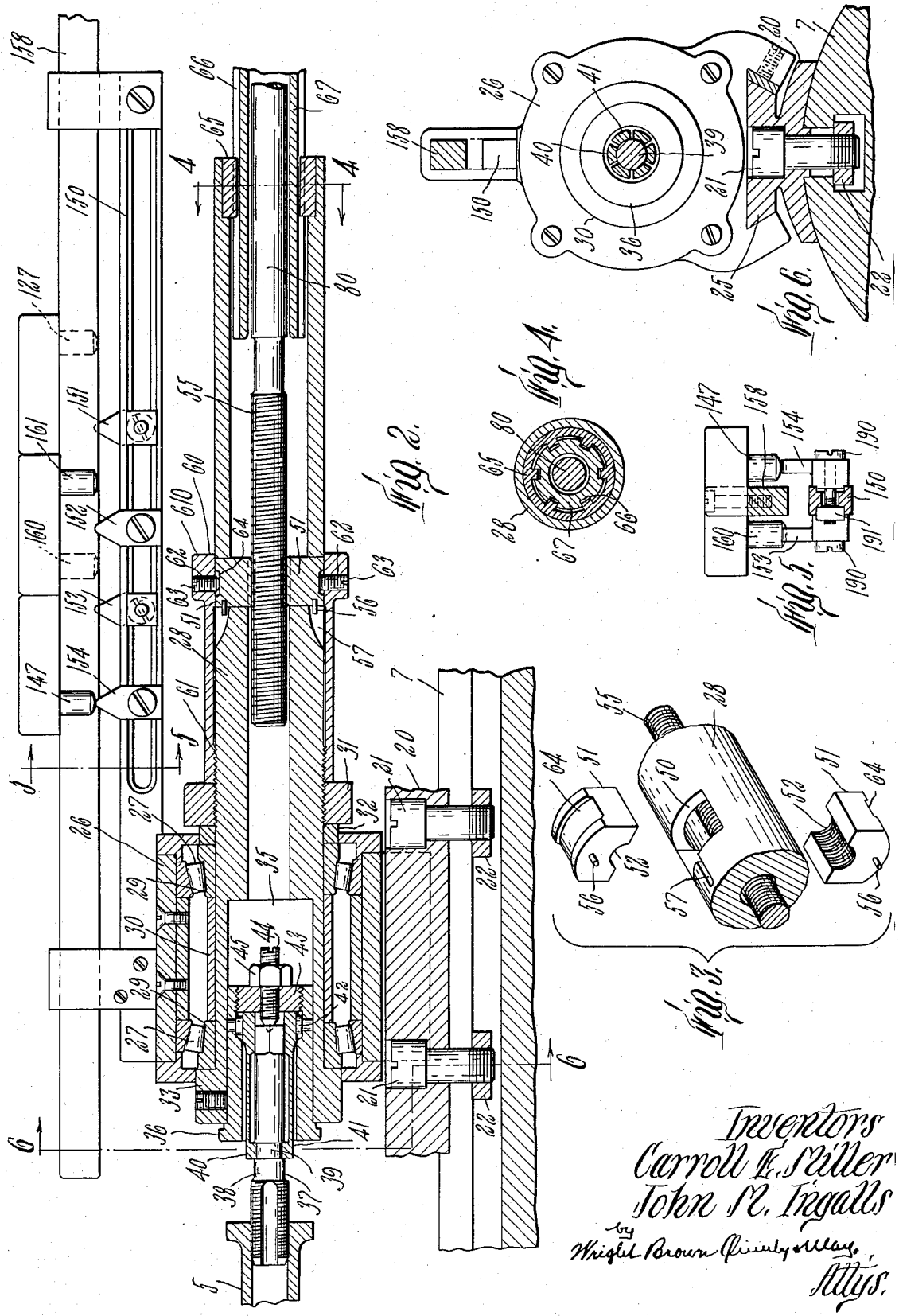
Inventors
Carroll E. Miller
John R. Ingalls
by Wright Brown Quinby & May
Attys.

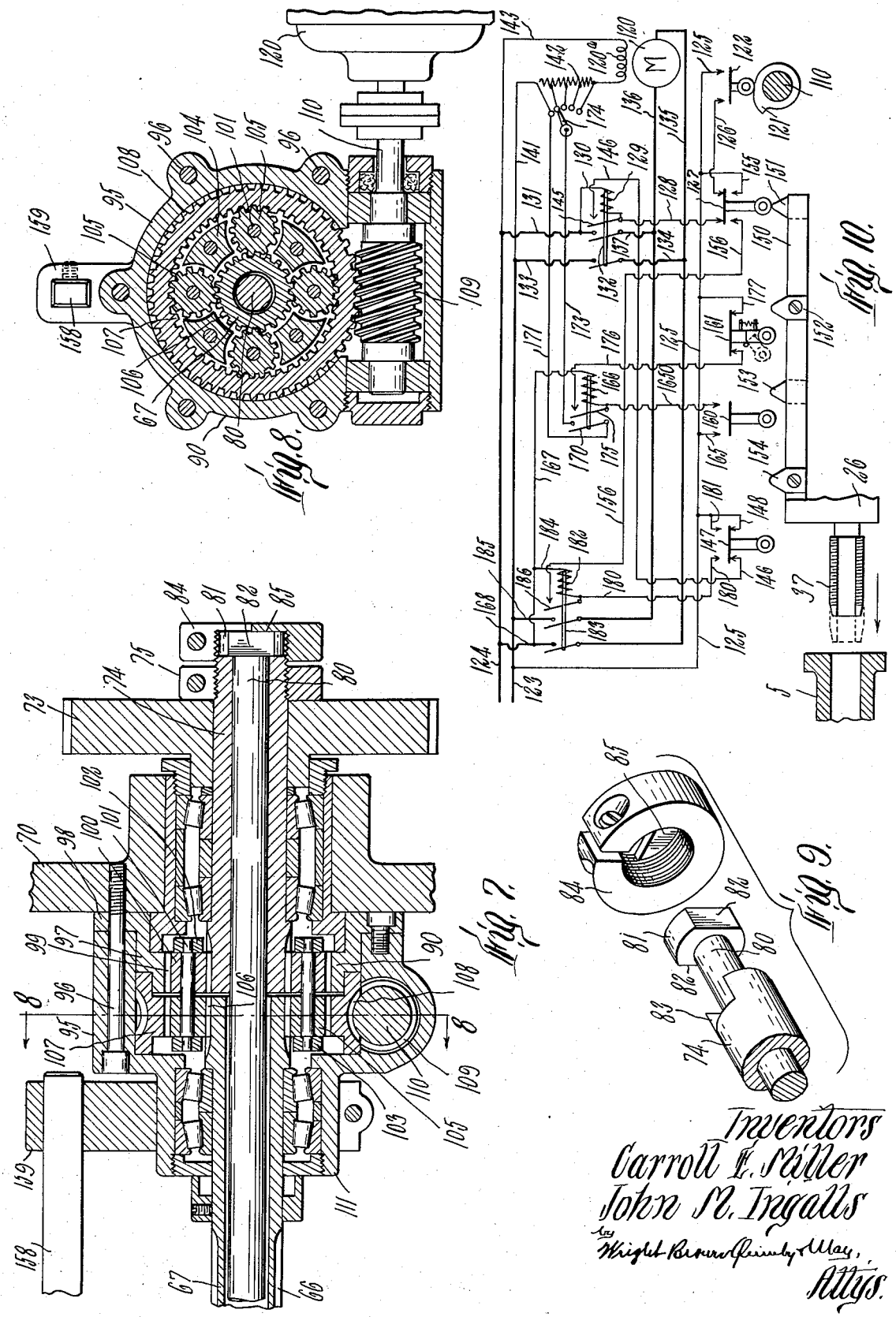

Patented May 15, 1945

2,376,164

UNITED STATES PATENT OFFICE 2,376,164

PRECISION THREADING ATTACHMENT

Carroll E. Miller and John M. Ingalls, Windsor, Vt., assignors to Cone Automatic Machine Company Inc., Windsor, Vt., a corporation of Vermont Application May 24, 1943, Serial No. 488,140

13 Claims. (Cl. 10—105)

This invention relates to mechanism by which threads may be cut in work with high accuracy and which may be applied as an attachment to an automatic lathe or screw machine.

Heretofore in machines of this character it has been customary to employ taps or dies to cut threads, allowing the tap or die to feed itself onto the work after being presented thereto. For some purposes work threaded in this manner is not sufficiently accurate, and heretofore the cutting of such work with the required accuracy has involved cutting the threads in a separate precision thread cutting machine, this requiring not only a separate machine but another handling of the work.

In accordance with the present invention the thread cutting tool, which is preferably a die or tap, is controlled accurately by a master screw and nut, so that inaccuracies from improper feed of the tool relative to the work are eliminated, and this is done on the same machine at which other machining operations are performed and without requiring any special handling of the work. By this means threads may be cut accurately, even though they may involve no more than a single turn, or the threading may be done for a long distance on the work up to the capacity of the machine with high accuracy throughout.

A further object of the invention is to provide such an attachment wherein the master screw and nut may be readily removed and replaced by another having different controlling characteristics such, for example, as for changing from a right to a left hand thread, or having a different lead or size.

A further object of the invention is to provide for automatic control of the threading by which the attachment starts into operation at the desired time in the machine cycle and threads to the desired extent, after which the threading tool is retracted and the operation stopped for indexing operation to bring another work piece into threading position.

Still another object of the invention is to provide for accurate and easy control of the relative rotation between the work and the threading tool and the reversal of this relative direction when threading has proceeded to the desired extent to cause the withdrawal of the threading tool from the work.

Further objects and advantages will appear from a description of an embodiment of the invention disclosed in the accompanying drawings in which Figure 1 is a fragmentary view partly in front elevation and partly in section of a multiple spindle lathe to which the attachment of this invention is shown as applied.

Figure 2 is a view somewhat similar to the left hand portion of Figure 1, but showing the threading mechanism in central longitudinal section and to a larger scale.

Figure 3 is a fragmentary exploded perspective view of the master lead screw and nut portions of the attachment.

Figures 4, 5 and 6 are detail sectional views on the correspondingly numbered section lines of Figure 2.

Figure 7 is a fragmentary longitudinal sectional view of a planetary drive mechanism.

Figure 8 is a sectional view on line 8—8 of Figure 7.

Figure 9 is a fragmentary exploded perspective view showing the manner of securing the rear end of the master lead screw.

Figure 10 is a wiring diagram of the control mechanism.

Figure 1:
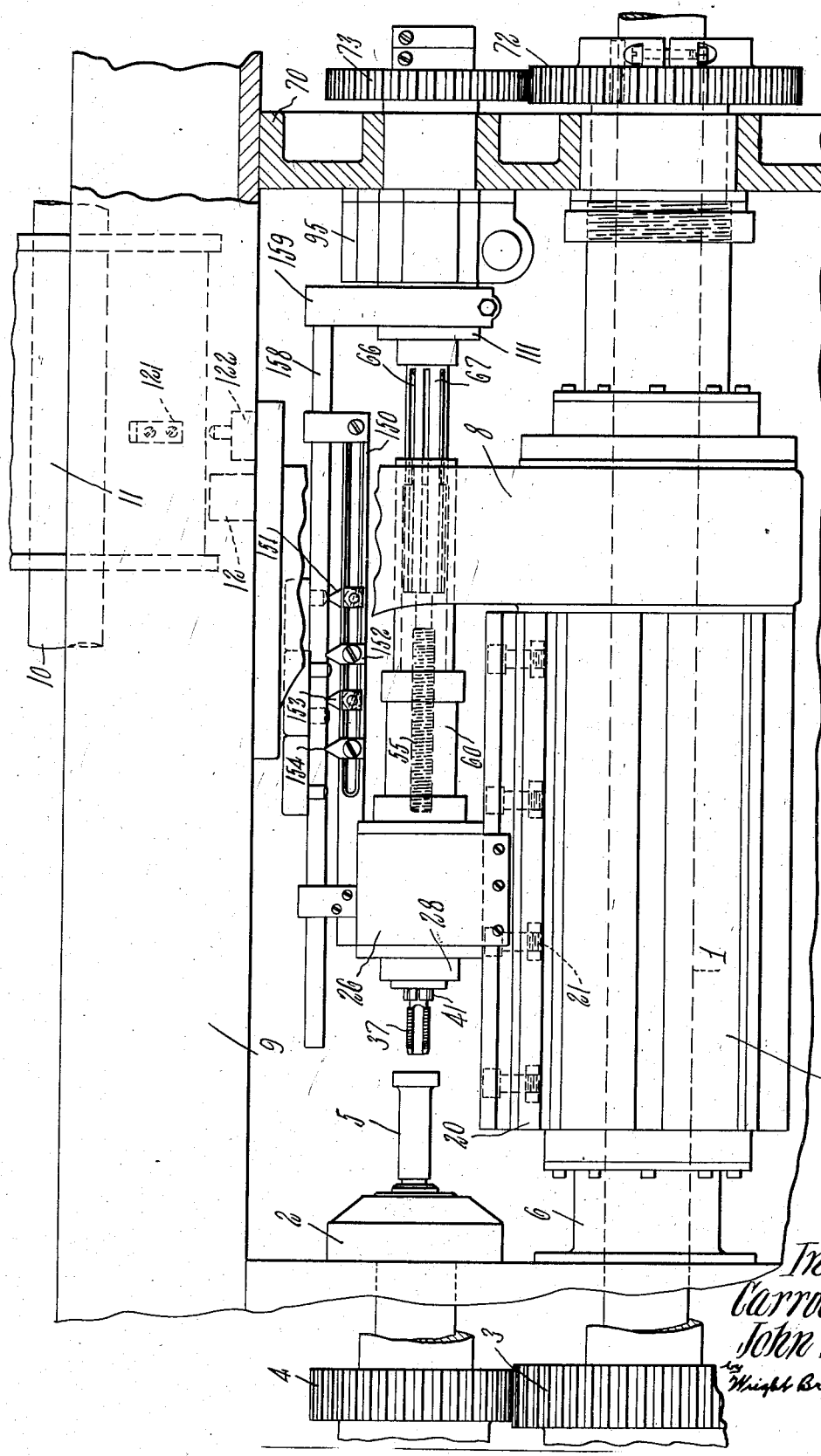

Referring to the drawings, the attachment of this invention is shown as applied to a multiple spindle automatic lathe of the well known Cone type, such as is shown, for example, in the Miller Patent No. 2,236,440 granted March 25, 1941, for Automatic multiple spindle machine. As shown in Figure 1, such a machine includes a work spindle carrier which is indexable about the axis of a shaft 1, and which contains in circular array about this axis, a plurailty of rotary work spindles such as 2. Each of these work spindles is rotated by rotation of the shaft 1, this being done, as shown, by a gear 3 fixed to the shaft 1 and meshing with a gear 4 fixed to each of the rotary spindles. These spindles are adapted to have stock extended therethrough, the portion which projects forwardly of the end of the spindle as at 5 being positioned to be operated upon by tools carried by the machine. Surrounding the shaft 1 and fixed to the spindle carrier is a sleeve 6 on which is slidably mounted a tool carrier 7. This tool carrier is attached to a slide 8 which is mounted for motion in the direction of the axis of the shaft 1 in an upper frame member 9. This frame member carries an overhead cam shaft 10 having a series of cam drums thereon, one of which is shown at 11, to which suitable cams are attached, which, when the cam shaft 10 rotates, controls the cycle of operations of the machine. As shown in Figure 1, the slide 8 is provided at its upper end with a cam follower 12 which is controlled by suitable cam means on the cam drum 11. These parts as thus described are usual with this type of machine.

The attachment which comprises this invention, includes a slideway 20 which is secured to the outer face of the tool slide 7. This tool slide is provided with a plurality of T shaped slots and the slideway 20 is secured by bolts and nuts 21 and 22, the nuts 22 engaging in the head of one of these T slots. The way 20 has a dovetail portion 25 on its upper edge on which is slidably guided a casing 26 which encloses a pair of spaced roller bearings 27 within which is journaled mechanism comprising a tube 28 carrying the inner bearing members 29 which are spaced by a sleeve 30. The left hand end of the tube 28 is provided with an enlarged diameter portion 33 presenting a shoulder to the left inner bearing member 29, and a collar 31 threaded onto a portion of the tube 28 and bearing against a ring 32, acts to retain the tube 28 against longitudinal motion within its bearing.

This end of the tube 28 has an enlarged diameter socket portion 35 within which is seated a socket member 36 for the reception of a threading tool, herein shown as a tap 37, this tap being held in approximately coaxial relation with the work 5. This tap is removably held in position, and for this purpose its shank 38 is shown as provided with a reduced diameter portion 39 in which may be engaged a plurality of spring fingers 40 of a tool gripping member 41. This member 41, which is of somewhat smaller external diameter than the internal diameter of the member 36, is provided with a pair of trunnions 42 engaging in sockets in the member 36, so that it is free to center itself in the work, and the rear end of the member 41 is backed up by a plug 43 threaded into the rear end of the member 36. A set screw 44 passing through the plug 43 and with a lock nut 45 thereon projects against the rear end of the tool 38 and imparts forward thrust thereto when the tool is pressed onto the work as will later appear.

This tube 28 is provided intermediate its ends with a pair of opposed slots 50 within which may be received segmental master nut pieces 51, the confronting faces of which are formed with internal threads as at 52, and mate the external threads of a master lead screw 55. Since various lead screws and nuts may be required, depending upon the type and size of threads which it is desired to cut in or on the work piece, the nut segments 51 are arranged to be detached readily and others substituted therefor, and as will later appear, the lead screw also may be removed and replaced by another, easily. The nut segments 51 are each shown as provided with a drive pin 56 which extends into a slot 57 in the tube 28. They may be retained in proper position after being inserted by a retaining sleeve 60 having threaded connection at 61 with the external threads on the tube 28. The opposite end of the sleeve 60 is provided with an enlarged diameter portion 610 having threaded holes 62 therethrough through which may be engaged set screws 63, the inner ends of which may bear in peripheral grooves 64 in the nut segments 51. By withdrawing these screws 63 the sleeve 60 may be unscrewed and moved axially away from the nut 31 so as to permit the segments to be removed and replaced by others, and when so replaced, and the sleeve 61 is returned to the position shown in Figure 2, tightening of the set screw 62 will serve to close the nut segments against the lead screw, taking up any wear therebetween.

The tube 28 is extended beyond the slots 50 for some distance away from the spindle carrier, and at its free end it is provided with a splined bushing 65 brazed therein engaging the splines in corresponding slots 66 of a sleeve 67. This connection permits extension and retraction of the tube 28, but compels it to rotate with the sleeve 67 as will later appear. This sleeve 67 extends at the right hand end, toward the frame member 70 which forms the inner wall of the driving housing column of the machine upon which the upper frame member 9 is supported. Inwardly of this partition 70 the drive shaft 1 has clamped thereto a gear ring 72 which meshes with a gear 73 on a quill or sleeve 74 which is journaled through the frame member 70. The gear 73 is held on the quill or sleeve 74 by means of a clamp spanner nut 75 which is threaded thereon.

The master lead screw 55 has a shank portion 80 which extends through the sleeve 67 and through the quill or sleeve 74 and is coaxial therewith, and as shown best in Figure 9, it has a head 81 at its outer end slabbed off on opposite sides as at 82 which fits into a slot 83 in the rear end of the quill 74, so that it is compelled to rotate with this quill. It is held in position with its head 81 in the slot 83 by a clamp spanner nut 84 which is also threaded onto the end of the quill 74 and has an end wall 85 which engages across the end of the head 81 and thus holds the lead screw against axial motion in the quill 74.

The quill or sleeve 74 and the sleeve 67 are connected in drive and driven relation, respectively, by a planetary gear mechanism indicated generally at 90 so that rotation is imparted from the quill 74 through this planetary gear mechanism to the sleeve 67 and through it to the tube 28 and through it to the threading tool 37. The quill 74 is connected in driven releation to the shaft 1 in the same gear ratio as is the spindle 2, so that the speed of rotation of the quill 74, and its direction of rotation, is exactly that of the work.

The planetary gear transmission is shown best in Figures 7 and 8. It comprises an outer casing 95 which is secured to the frame member 70 as by the bolts 96. Formed as a part of this casing is a ring member 97 provided with an end flange 98 through which the bolts 96 pass, and an offset inwardly projecting internal gear element 99 with which mesh four pinions 100, each fixed to a long axial pin 101, these pins being retained in the proper spaced relation by a pair of end rings 102 and 103 spaced by blocks 104 which project in between the gears. These pinions 100 mesh with teeth cut in the end portion of the quill 74 so that when the quill 74 is turned, each of the pinions 100 with its shaft 101, is rotated and the cage comprising the gears and rings and spacer blocks 104 is also rotated as a unit around the inner face of the fixed portion 99. Each of the pins 101 also carries a second gear 105 fixed thereto which meshes with gear teeth 106 cut in the adjacent end of the sleeve 67.

These gears 105 also mesh with internal gear teeth on a supplemental drive member 107, which is rotatably mounted between the housing 95 and the member 97 and has worm gear teeth in its periphery as at 108 with which mesh a worm 109 secured to a transverse worm shaft 110 journaled in an extension of the casing 90. So long as the drive member 107 is held stationary, the rotation of the quill or sleeve 74 imparts a corresponding rotation to the sleeve 67, all the gears 100 and 105 being of the same diameter, but by rotating the drive 107, however, in either direction, a speed component, depending upon the direction and speed of rotation of this drive member, is algebraically added to that imparted by rotation of the quill 74, thus to produce a differential speed between the quill 74 and the sleeve 67 either greater than or less than that of the quill 74, depending upon the direction of rotation of the drive member.

So long as the sleeve and quill 67 are rotating in the same direction, the lead screw and its nut are rotated at the same speed, and hence there is no axial motion between the threading tool and the work, and furthermore the threading tool is rotating at exactly the same speed and direction as the work so that they are relatively stationary.

The worm shaft 110 is shown as driven by a motor 120, and this motor, as shown in Figure 10, may be automatically controlled. For this purpose the cam shaft 10 may be provided with a cam 121 which at suitable times in the cycle of operations of the machine will close a starting switch at 122. Current from the lines 123 and 124 will then be closed from the line 123, lead 125, switch 122, lead 126, switch 127, lead 128, switch closing coil 129, and leads 130 and 131 to the line 124. Energization of the switch closing coil 129 closes the two pole switch at 132, energizing the armature of the motor 120 from the line 123 through leads 133, switch 132, leads 134 and 135, the armature of motor 120, leads 136 and 137, switch 132, and lead 131 to the line 124, the motor field being energized from line 123 through lead 141, field rheostat 142, field 120a and lead 143 to line 124. This starts the motor 120 in a direction such that the threading tool, being away from the work in the position shown in Figures 1 and 10, is rotated at a speed different from that of the work and in such direction that the threading tool will thread onto or into the work at the same time that the lead nut and screw are relatively rotated in a direction to move the threading tool up to the work, and at a relatively high speed. The energization of the coil 129 also closes the holding switch arm 145 which continues energization of the coil 129 from the line 123, leads 125 and 148, switch 147, lead 146, switch 145, coil 129, leads 130 and 131 to line 124.

As the machine continues to operate, the cam 121 releases the switch 122, which opens, and forward motion of the casing 26 produced by the rotation of the motor 120, carries with it a bar 150 along which are adjustably fixed the switch cams 151, 152, 153 and 154. The cam 151 first releases the switch 127 which breaks contact between the leads 126 and 128 and makes contact between leads 155 and 156. The switches 127 and 147 as well as two other cam actuated switches 160 and 161 are mounted in stationary positions along a guide bar 158 secured as by a clamp 159 to the fixed transmission casing 95.

As the threading tool approaches the work, the cam 153 approaches and closes the switch 160. This closes a circuit from the line 123 through the leads 125 and 165, switch 160, lead 1650, switch coil 166 and leads 167 and 168 to the line 124. This closes the switch arm 170 which short circuits an adjustable portion of the field rheostat 142 through leads 171, switch arm 170, lead 173, and rheostat slider 174, slowing the motor 120 to reduce the relative speed of rotation between the threading tool and the work to cutting speed. Closing of the switch 170 also closes a holding switch 175, which closes a circuit through the holding coil 166 from leads 167 and 168 and the line 124, through the lead 176, switch 161, leads 177 and 125 to the line 123, so that when the cam 153 passes beyond the switch 160, allowing the switch 160 to open, the switch arm 170 remains closed.

This condition persists until the threading tool has operated upon the work to the desired distance, whereupon the cam 154 actuates the reverse position switch 147 to open the circuit between the leads 146 and 148 and to close a circuit between leads 180 and 181. Breaking the connection between the leads 146 and 148 opens the holding circuit through the coil 129 and permits the switch 132 to open, thus interrupting the current to the armature of the motor 120, while making connection between the leads 180 and 181 energizes the switch closing coil 182, and closes the reverse direction motor switch 183. The coil 182 then is energized from line 123 through leads 125, 148 and 181, switch 147, lead 180, coil 182, leads 184, 167 and 168 to line 24. Closing of the switch 183 connects line 123 through lead 185, switch 183, lead 136, armature of the motor 120, lead 135, switch 183 and lead 168 to the line 124. When the switch 183 is closed, a holding switch 186 is also closed, thus establishing a circuit from line 123, through leads 125 and 155, switch 127 (which now closes leads 155 and 156), lead 156, switch 186, coil 182, and leads 184, 167, and 168 to line 124. The direction of rotation of the motor being now reversed, the direction of rotation of the threading tool relative to the work and its direction of axial motion are also reversed, so that the tool is withdrawn from the work at working speed. This continues until the tool clears the work and the cam 152 opens the switch 161. This opens the holding circuit through the holding coil 166, allowing the switch 170 to open, cutting out the by-pass about a portion of the rheostat 142, weakening the motor field excitation and speeding up the motor 120 in withdrawing direction so that the threading tool is retracted at high idle speed. This persists until the cam 151 returns the stop switch 127 to the position shown in Figure 10, whereupon the reverse switch holding circuit through the switch 186 is broken between leads 155 and 156 and the motor stops, connections being reversed between the leads 126 and 128 for actuation of the motor at high speed in feeding direction as soon as the cam 121 again closes the switch 122 to start the next cycle of operations. When the tool feeds in, the cam 152 is ineffective to open the switch 161, the cam follower for this switch yielding as shown in dotted lines, but it is effective in the reverse direction of motion of the tool feed, the cam follower being unable to yield in the opposite direction. The natural dynamic braking effect of the motor will tend to hold the worm drives 109 and 106 stationary and render the rotation of the attachment with its threading tool synchronous with the speed of the work.

The manner in which the switch cams 151, 152, 153 and 154 are secured to the bar 150 is illustrated best in Figure 5, alternate switch cams being clamped to opposite sides of the slotted bar 150 as by bolts and nuts 190 and 191, respectively, the corresponding switches with their push button actuation being also arranged alternately on opposite sides of the guide bar 158.

From the foregoing description of an embodiment of this invention, it should be evident to those skilled in the art that various changes and modifications might be made without departing from the spirit or scope of this invention.

We claim:

1. The combination with a rotary work spindle and means for rotating said spindle, of a thread cutting tool for operating on a work piece projecting from said spindle, extensible and retractible means for holding said tool for motion axially of the work, said means including a planetary transmission gear device, means driven by said rotating means for rotating said holding means at the same rate and in the same direction as said spindle, and means for imparting a drive to said device to be algebraically superposed on the rotation of said tool produced by the rotation of said rotating means to impart a speed of rotation to said tool different from that of said spindle.

2. The combination with a rotary work spindle and means for rotating said spindle, of a thread cutting tool for operating on a work piece projecting from said spindle, extensible and retractible means for holding said tool for motion axially of the work, said means including a planetary transmission gear device, means driven by said rotating means for rotating said holding means at the same rate and in the same direction as said spindle, and means for imparting a drive to said device to be algebraically superposed on the rotation of said tool produced by the rotation of said rotating means to impart a speed of rotation to said tool different from that of said spindle, said holding means including cooperating parts including a lead screw and nut, one of said parts being connected to control the axial position of said tool and the other of said parts being held against axial motion, and one only of said parts being operatively connected to said device to be rotated relative to the other of said parts by said device driving means.

3. The combination with a rotary spindle, means for rotating said spindle, of a threading tool, means for supporting said tool for cutting threads on work carried by said spindle, said supporting means including elements comprising a lead screw and nut by relative rotation of which said tool may be moved axially of the work, means for rotating said supporting means as a unit at the same speed and in the same direction as said spindle, means for algebraically adding a rotational component to one only of said elements to impart a relative rotation between said elements, and a corresponding relative rotation between said tool and spindle, and means for controlling said adding means.

4. The combination with a rotary spindle, means for rotating said spindle, of a threading tool, means for supporting said tool for cutting threads on work carried by said spindle, said supporting means including elements comprising a lead screw and nut by relative rotation of which said tool may be moved axially of the work, means for rotating said supporting means as a unit at the same speed and in the same direction as said spindle, means including an electric motor for imparting a relative rotation between said elements and a corresponding relative rotation between said tool and spindle, a switch actuable to start said motor at a rapid rate in a direction to feed the tool toward the work, and switch means controlled by the tool position to slow the motor as said tool nears the work, to reverse the direction of rotation of said motor when threading of the work has proceeded to a predetermined extent, to retract said tool at slow speed and thereafter at a higher speed, and to stop the rotation of said motor when the tool has backed off from the work to starting position.

5. An attachment for a multiple spindle lathe having an indexing spindle carrier provided with a plurality of rotary work spindles in circular array about its indexing axis, and a drive shaft coaxial with said indexing axis and connected to rotate said spindles, said attachment comprising a quill coaxial with a spindle in indexed position, driving connections from said shaft to said quill for rotating said quill in the same direction and at the same speed as said spindle, a sleeve arranged coaxial with said quill, a planetary gearing including a supplemental rotary drive member connecting said quill and sleeve for simultaneous and equal rotation of said sleeve from said quill when said drive member is stationary and at a different speed when said drive member is rotated, a slide movable parallel to said axis, a tube coaxial with said spindle sleeve and quill journaled in said slide and slidably and non-rotatably connected to said sleeve, a threading tool carried by said tube for operating on work carried by said spindle, a lead screw secured within said quill and having a threaded portion extending into said tube, a nut secured to said tube and in threaded engagement with said lead screw, the threads of said screw and nut having the same lead as said threading tool, means actuable to rotate said drive member in either direction and at desired speeds, and means for controlling said rotating means.

6. An attachment for a multiple spindle lathe having an indexing spindle carrier provided with a plurality of rotary work spindles in circular array about its indexing axis, a drive shaft coaxial with said indexing axis and connected to rotate said spindles, and a tool carrier through which said shaft extends movable therealong toward and from said carrier, said atttachment comprising a quill coaxial with a spindle in one indexed position, driving connections from said shaft to said quill for rotating said quill in the same direction and at the same speed as said spindle, a sleeve arranged coaxial with said quill, planetary gearing including a supplemental drive member connecting said quill and sleeve for simultaneous and equal rotation of said sleeve from said quill when said drive member is stationary and at a different speed when said drive member is rotated, a longitudinal slideway carried by said tool carrier, a slide movable on said slideway, a tube coaxial with said spindle sleeve and quill journaled in said slide and slidably and non-rotatably connected to said sleeve, a threading tool carried by said tube for operating on work carried by said spindle, a lead screw removably secured within said quill and having a threaded portion extending into said tube, a nut secured to said tube and in threaded engagement with said lead screw, means for rotating said drive member in either direction and at desired speeds, and means for controlling said rotating means.

7. An attachment for a multiple spindle lathe having an indexing spindle carrier provided with a plurality of rotary work spindles in circular array about its indexing axis, a drive shaft coaxial with said indexing axis and connected to rotate said spindles, and a tool carrier through which said shaft extends movable therealong toward and from said carrier, a cam shaft having cams for controlling the machine cycle, said attachment comprising a quill coaxial with a spindle in one indexed position, driving connections from said shaft to said quill for rotating said quill in the same direction and at the same speed as said spindle, a sleeve arranged coaxial with said quill, planetary gearing including a supplemental drive member connecting said quill and sleeve for simultaneous and equal rotation of said sleeve from said quill when said drive member is stationary and at a different speed when said drive member is rotated, a longitudinal slideway carried by said tool carrier, a slide movable on said slideway, a tube coaxial with said spindle sleeve and quill journaled in said slide and slidably and non-rotatably connected to said sleeve, a threading tool carried by said tube for operating on work carried by said spindle, a lead screw removably secured within said quill and having a threaded portion extending into said tube, a nut secured to said tube and in threaded engagement with said lead screw, means for rotating said drive member in either direction and at desired speeds, and means for controlling said rotating means, said controlling means comprising a starting switch starting the rotation of said drive member in the direction to move said tool toward said spindle carrier, and a cam carried by said cam shaft for actuating said starting switch, reverse direction and stop switches, and dogs arranged relative to said reverse direction and stop switches along the path of motion of said tube for actuating said reverse and stop switches in accordance with the axial position of said tool.

8. In combination, a pair of coaxially arranged sleeves, a lead screw having a shank portion removably secured coaxially in one of said sleeves, and projecting freely into the other of said sleeves, a planetary transmission connecting adjacent ends of said sleeves and having a revoluble drive member, means for rotating said one sleeve and through said transmission rotating the other of said sleeves at the same speed and in the same direction while said drive member is stationary, means for rotating said drive member to impart a differential rate of rotation to said sleeves, a tube rotatable with and axially slidable relative to the other of said sleeves, a nut element engageable with the threads of said lead screw and fixed to said tube and causing axial motion of said tube when and only when said drive member is being rotated at which time also said tube and said one sleeve have differential rates of rotation, and a threading tool carried by said tube.

9. In combination with a rotary work spindle, a pair of coaxially arranged sleeves also coaxial with said spindle, a lead screw having a shank portion removably secured coaxially in one of said sleeves, and projecting freely into the other of said sleeves, a planetary transmission connecting adjacent ends of said sleeves and having a revoluble drive member, means for rotating said one sleeve and through said transmission rotating the other of said sleeves at the same speed and in the same direction while said drive member is stationary, means for rotating said spindle and work carried thereby at the same speed and in the same direction as said one sleeve, means for rotating said drive member to impart a differential rate of rotation to said sleeves, a tube rotatable with and axially slidable relative to the other of said sleeves, a nut element engageable with the threads of said lead screw and fixed to said tube and causing axial motion of said tube when and only when said drive member is being rotated at which time also said tube and said one sleeve have differential rates of rotation, and a threading tool carried by said tube in position to operate on work carried by said spindle.

10. In combination, a pair of telescopically related tubes, means connecting said tubes for simultaneous rotation, a lead screw arranged coaxially within one of said tubes and projecting into the other of said tubes, said other tube having a pair of oppositely disposed slots therethrough at one portion of its length, nut segments for said lead screw insertable through said slots into mating engagement with the threads of said lead screw, means for releasably securing said segments in said slots, a tool operatively connected to said other tube, and means for rotating said screw with reation to said tubes.

11. In combination, a pair of telescopically related tubes, a lead screw arranged coaxially within one of said tubes and projecting into the other of said tubes, said other tube having a pair of oppositely disposed slots therethrough at one portion of its length, nut segments for said lead screw insertable through said slots into mating engagement with the threads of said lead screw, means for releasably securing said segments in said slots, a tool operatively connected to said other tube, means for rotating said screw with relation to said tubes, and means for rotating said one tube.

12. In combination, a pair of telescopically related tubes, means connecting said tubes for simultaneous rotation, a lead screw arranged coaxially within one of said tubes and projecting into the other of said tubes, said other tube having a pair of oppositely disposed slots therethrough at one portion of its length, nut segments for said lead screw insertable through said slots into mating engagement with the threads of said lead screw, and a sleeve on said slotted tube for bridging over said segments and holding said segments in position, said sleeve having threaded connection with said slotted tube to releasably hold said sleeve in segment-holding position.

13. In combination, a quill having a slot in one end, a lead screw within said quill and having a head at one end fitting within said slot, and a spanner nut engageable over the slotted end of said quill and having a portion bridging across said head to retain said lead screw and quill in assembled relation.

CARROLL E. MILLER.
JOHN M. INGALLS.